United States Patent [19]

Koyama

[11] Patent Number: 5,070,447
[45] Date of Patent: Dec. 3, 1991

[54] INTERRUPT CIRCUIT AND INTERRUPT PROCESSING METHOD FOR MICROCOMPUTER

[75] Inventor: Hiroshi Koyama, Isesakishi, Japan

[73] Assignee: Sanyo Electric Co., Ltd., Osaka, Japan

[21] Appl. No.: 458,427

[22] Filed: Dec. 28, 1989

[30] Foreign Application Priority Data

Jan. 19, 1989 [JP]  Japan .................................. 1-10209

[51] Int. Cl.$^5$ ............................................. G06F 9/46
[52] U.S. Cl. ................................ 395/725; 364/241.2;
364/241.4; 364/241.5; 364/241.6; 364/941.0;
364/941.3; 364/941.6; 364/941.7; 364/DIG. 1;
364/DIG. 2
[58] Field of Search .................. 364/200, 241.2, 241.4,
364/241.5, 241.6, 900, 941.0, 941.3, 941.6, 941.7

[56] References Cited

U.S. PATENT DOCUMENTS

| | | | |
|---|---|---|---|
| 3,641,505 | 2/1972 | Artz et al. .................... | 364/200 |
| 3,949,371 | 4/1976 | Pederzini . | |
| 4,250,546 | 2/1981 | Boney et al. ................. | 364/200 |
| 4,319,338 | 3/1982 | Gaudowski et al. ......... | 364/900 |
| 4,488,227 | 12/1984 | Miu et al. ..................... | 364/200 |
| 4,495,571 | 1/1985 | Staplin, Jr. et al. .......... | 364/200 |
| 4,636,944 | 1/1987 | Hodge . | |

FOREIGN PATENT DOCUMENTS

1233601  5/1971  United Kingdom .

OTHER PUBLICATIONS

Bhatia et al., "Control Unit Modified Channel Priority", *IBM Technical Disclosure Bulletin*, vol. 22, No. 4, Sep., 1979, 1576–1578.

Zaks, "Programmierung des 6502", Sybex, 6502 Serie—Band 1, 219–225.

Economidis, "A Microprogrammable, Bipolar, LSI Interrupt Structure Using the AM2914", *Am2914 Priority Interrupt Encoder*, 1976, 1–21.

*Primary Examiner*—Michael R. Fleming
*Assistant Examiner*—Robert S. Hauser
*Attorney, Agent, or Firm*—Oliff & Berridge

[57] ABSTRACT

An interrupt circuit for a microcomputer, in which requests for multiple interrupt processing arise at the same time, are executed in the assigned priority order. To assign a processing priority, the interrupt circuit comprises a first priority assignment control circuit and a second priority assignment control circuit. Furthermore, in order to execute a high priority interrupt processing with a minimum lag time, the present invention comprises the steps of: issuing a software interrupt request signal assigned a lower priority while executing an interrupt request based on a request signal assigned a high priority level; executing a minimum required processing based on the request signal with a high priority level; executing and completing processing based on a request signal assign a low priority level; and resuming, by the software interrupt request signal, a rest part of the interrupted processing based on the request signal with a high priority level, whereby the plurality of interrupt requests which occurred at the same time can be processed with high efficiency

4 Claims, 1 Drawing Sheet

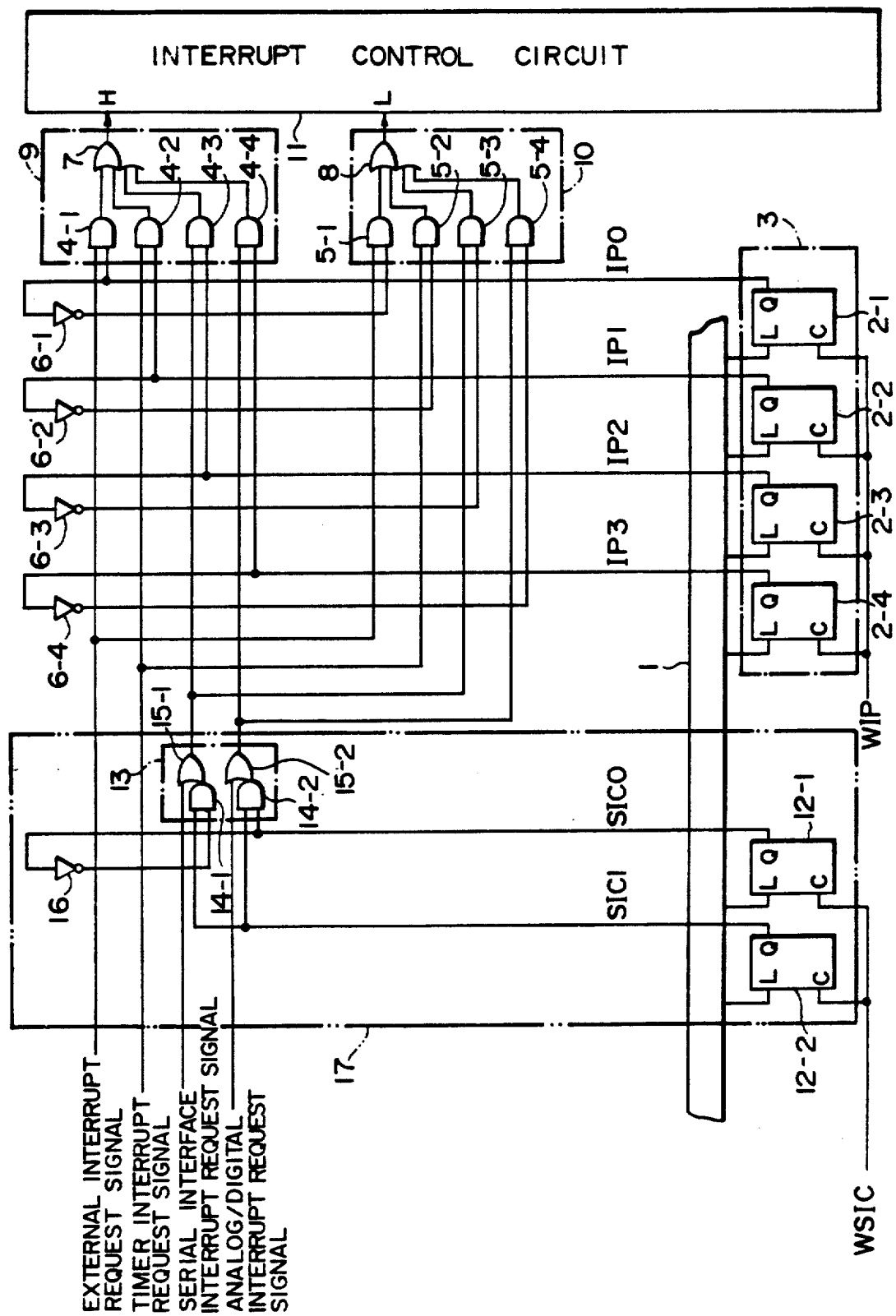

INTERRUPT CIRCUIT AND INTERRUPT PROCESSING METHOD FOR MICROCOMPUTER

BACKGROUND OF THE INVENTION

1. Field of the Invention

The present invention relates to an interrupt circuit and an interrupt processing method for microcomputers, and more particularly to an interrupt circuit for microcomputers which processes multiple interrupts while the CPU is processing a main program.

2. Description of the Prior Art

In general, a requirement for interrupt processing occurs frequently while a main program is being processed in a microcomputer. Particularly, two interrupt requests such as an external interrupt request and a timer interrupt request, frequently occur at one time.

A microcomputer has a plurality of interrupt programs to be processed during the processing of the main program. A plurality of interrupt request signals are given a priority level in order to cope with the case where a plurality of interrupt request signals for a plurality of interrupt programs arise at the same time. Specifically, the plurality of interrupt request signals are assigned to either a low priority or a high priority.

Conventionally, a program memory of the microcomputer is provided with a plurality of address areas (sometimes called vectors), and either a low priority level or high priority level is a priori assigned to the plurality of address areas by means of a hardware. The plurality of interrupt request signals are fixed to either a low priority level or a high priority level in accordance with specifications of the microcomputer.

Thus, specifications of some microcomputers require assignment of a high priority level to a software interrupt request signal, producing such a disadvantage in the prior art that if two interrupt request signals with a high priority and a low priority occur simultaneously with the software interrupt request signal assigned to a high priority level, a remaining part of the processing of the interrupt request signal given a high priority in response to the software interrupt request signal is consecutively carried out after a minimum required processing of the interrupt request signal with a high priority is firstly conducted without executing the processing of the interrupt signal with a low priority.

In order to overcome this drawback in the prior art, according to this invention, the software interrupt request signal is constantly assigned to a low priority level with the help of the program processing.

In the case where two interrupt requests arise concurrently while a main program is being processed, the conventional solution comprises the steps of:

performing the minimum required processing of an external interrupt;

suppressing the remaining external interrupt processing to carry out timer interrupt processing; and completing the remaining processing of the external interrupt request by means of software interrupt processing initiated by a software interrupt request signal.

Software interrupt processing is used when executing the processing of two interrupt requests which occur simultaneously with high efficiency.

Further, in the solution set forth in the above, when the external interrupt processing and the timer interrupt processing occurred at the same time were executed, for instance, it was necessary to assign a low priority level to the external interrupt processing request signal for performing the external interrupt processing and a high priority to the timer interrupt request signal for performing the timer interrupt processing. As a result, a minimum required processing of the timer interrupt request signal with a high priority level is carried out and a software interrupt request signal is issued. Then, processing of the external interrupt request signal with a low priority level is performed. Finally, in response to the software interrupt request signal, a rest of the processing of the timer interrupt request signal is then executed, namely, the processing of the interrupt request signal with a high priority level is executed before processing the interrupt request signal with a low priority.

As described above, a software interrupt request signal was assigned to the same priority assignment data selector as an interrupt request signal given either a high or a low priority.

According to the prior art, when a software interrupt request signal is assigned to the same priority assignment data selector as an interrupt request signal with a high priority, the software interrupt processing is executed and the rest of the timer interrupt processing is executed subsequent to the software interrupt processing, because the software interrupt request signal is already fixed to a high priority. If the software interrupt request signal is assigned to a high priority, the software interrupt processing will be executed so as to execute before the external interrupt processing; however, it is essential to execute the minimum required processing of the timer interrupt request when the external and timer interrupt requests arise at the same time.

Thus, in the prior art, users could not always use the software interrupt request processing as they intend whenever multiple interrupt processings were required.

SUMMARY OF THE INVENTION

A primary object of the present invention is to provide a circuit and a processing method, in which a software interrupt request can be controlled so as to fulfill a plurality of interrupt processings without any malfunction.

An interrupt control circuit of this invention comprises: an interrupt control circuit having a first input terminal, to which at least one interrupt request signal with a high priority is applied, and a second terminal, to which at least one interrupt request signal with a low priority is applied. Said interrupt control circuit further comprises a first priority assignment control circuit which is capable of assigning either a high priority or a low priority to multiple interrupt request signals and a second priority assignment control circuit which is capable of assigning a low priority level to a software interrupt request signal.

With this circuit, the software interrupt request signal is constantly assigned to the low priority level by the second priority assignment control circuit. Therefore, if two interrupt requests arise at the same time, the software interrupt signal, which instructs a microcomputer to execute the remaining interrupt processing which has been assigned to a low priority and suppressed after completing a nesting, is produced without fail while the interrupt processing with a high priority is being executed. Moreover, the first priority assignment control circuit comprises: a plurality of first latch circuits and a plurality of priority assignment selectors; and the second priority assignment control circuit comprises: second and third latch circuits, and a changeover circuit.

An interrupt processing method comprises the steps of:

assigning a low priority to a software interrupt request signal according to a predetermined instruction included in a program of said microcomputer;

issuing said software interrupt request signal and executing a minimum required processing of said first interrupt request signal during processing of said first interrupt request signal;

executing processing of said second interrupt request signal;

terminating processing of said second interrupt request signal; and resuming a rest of the processing of said interrupted first request signal in response to said software interrupt request signal.

Thus, the present invention solves the problem of the prior art by means of the above-mentioned circuit and interrupt processing steps.

Further features of the invention, its nature and various advantages will be more apparent from the accompanying drawing and the following detailed description of the invention.

BRIEF DESCRIPTION OF THE DRAWING

The attached figure is a schematic diagram illustrating a preferred embodiment of an interrupt circuit for a microcomputer according to the present invention.

DETAILED DESCRIPTION OF THE PREFERRED EMBODIMENT

Various data are transferred over data bus (1).

A first priority assignment control circuit comprises a plurality of first latch circuits (2-1) to (2-4).

Output signals IP0–IP3, which are delivered from Q (output) terminals of latch circuits (2-1) to (2-4), respectively, are applied to a first input terminal of AND gates (4-1) to (4-4), respectively.

These signals are inverted by a plurality of inverters (6-1) to (6-4), and then applied to a first input terminal of AND gates (5-1) to (5-4), respectively.

Consequently, respective pairs of the AND gates, that is, (4-1) and (5-1), (4-2) and (5-2), (4-3) and (5-3), (4-4) and (5-4) function complementarily to each other.

The output signals from AND gates (4-1) to (4-4) are applied to OR gate (7), whereas the output signals from AND gates (5-1) to (5-4) are applied to OR gate (8).

AND gates (4-1) to (4-4) and OR gate (7) together constitute first priority assignment data selector (9), while AND gates (5-1) to (5-4) and OR gate (8) together constitute second priority assignment data selector (10).

An interrupt request signal delivered from OR gate (7) is applied to terminal H of interrupt control circuit (11). Interrupt control circuit (11) recognizes the interrupt request signal as the signal assigned a high priority.

In the same manner, an interrupt request signal delivered from OR gate (8) is applied to terminal L of interrupt control circuit (11); that is, the signal is recognized as a low priority signal by interrupt control circuit (11).

In the case where the two interrupt request signals are applied to OR gates (7) and (8) at the same time, interrupt control circuit (11) executes a multiple interrupt processing following the steps of:

firstly, executing the minimum required processings of an interrupt processing based on an interrupt request signal which is applied to terminal L of interrupt control circuit (11) and given a high priority;

secondly, executing the remaining part of an interrupt processing with a low priority and then executing the other interrupt processing based on the interrupt processing signal which is applied to terminal L of interrupt control circuit (11) and given a low priority; and thirdly, as will be mentioned later, a rest of the processing of the interrupt request signal assigned a high priority level is resumed.

As is apparent from the above explanation, in order to assign either a high or low priority to an interrupt request signal applied to an input terminal of either AND gates (4-1) to (4-4) or AND gates (5-1) to (5-4), it is only necessary to switch the state of one of the pairs of the AND gates which function complementarily to each other; (4-1) and (5-1), (4-2) and (5-2), (4-3) and (5-3), and (4-4) and (5-4) from an operating (enabled) to a cut-off (disabled) state and vice versa under control of output signals IP0-IP3 from first latch circuits (2-1) to (2-4).

Specifically four priority assignment data delivered from data bus (1) to latch terminals L of first latch circuits (2-1) to (2-4), respectively, are latched by applying priority assignment pulse WIP to clock terminals C of first latch circuits (2-1) to (2-4), which are connected together in common. AND gates (4-1) to (4-4) and (5-1) to (5-4) are controlled according to whether or not the latched data has a "1" or a "0" value, i.e., IP0 to IP3, which are outputs from each of the latch circuits (2-1) to (2-4).

For example, when all latched data from IP0 to IP3 have a "1" value, all AND gates (4-1) to (4-4) enter operating conditions, so that an interrupt request signal applied to any of AND gates (4-1) to (4-4) is assigned to a high priority.

On the contrary, when all latched data from IP0 to IP3 have a "0" value, all AND gates (5-1) to (5-4) enter operating conditions, so that an interrupt request signal applied to any of AND gates (5-1) to (5-4) is assigned to a low priority.

A software pulse WSIC, which is used to produce a software interrupt request signal and to assign a low priority to the software interrupt request signal, is applied to clock terminals C of latch circuits (12-1) and (12-2) constituting a plurality of second latch circuits. Also, the data delivered from data bus (1) to latch terminals L of latch circuits (12-1) and (12-2) are latched in response to software pulse WSIC.

Changeover circuit (13) includes AND gates (14-1), (14-2) and OR gates (15-1), (15-2). Software priority assignment data SIC0, which is delivered from terminal Q of latch circuit (12-1), is applied to a first input terminal of AND gate (14-2). Data $\overline{SIC0}$, which is the inverse of data SIC0 and generated by inverter (16), is applied to a first input terminal of AND gate (14-1).

In this embodiment, either of the OR gates, i.e. (15-1) AND (15-2), can feed out a software interrupt request signal so that at least one of the two interrupt requests signals delivered from OR gates (15-1) and (15-2) can be assigned to a low priority, because AND gates (14-1) and (14-2) are complementarily to each other.

Software interrupt request signal SIC1, which is delivered from the Q terminal of latch circuit (12-2), is applied to a second input terminal of AND gates (14-1) and (14-2). An external interrupt request signal is applied to a second input terminal of AND gates (4-1) and (5-1). In the same way, a timer interrupt request signal is applied to a second input terminal of AND gates (4-2) and (5-2). The output signals from OR gates (15-1) and (15-2) are applied to respective second input terminals of the pairs of AND gates (4-3) and (5-3), and (4-4) and (5-4), respectively.

Latch circuits (12-1) and (12-2), changeover circuit (13) and inverter (16) function together as second control circuit (17).

This embodiment is an example based on the assumption that a serial interface interrupt request signal and an analog/digital interrupt request signal are applied to one of the two input terminals of respective OR gates (15-1) and (15-2).

The operation of the interrupt circuit of the present invention will now be explained by way of the following example.

For purposes of illustration, it is assumed that the illustrated circuit is designed to assign a low priority processing level to both an external interrupt request signal and an analog/digital interrupt request signal, and to assign a high priority processing level to both a timer interrupt request signal and a serial interface interrupt request signal.

In order to achieve the above condition, the Q terminals of latch circuits (2-1) to (2-4) produce latched data outputs IP0–IP3 as shown below:

| Latch circuit | Latched data output |
|---------------|---------------------|
| (2-1)         | IP0 = "0"           |
| (2-2)         | IP1 = "1"           |
| (2-3)         | IP2 = "1"           |
| (2-4)         | IP3 = "0"           |

With these outputs, AND gates (4-2), (4-3), (5-1) and (5-4) are enabled. In other words, the AND gates will allow signals applied to second input terminals of AND gates (4-2), (4-3), (5-1) and (5-4) to be delivered to OR gates (7) and (8), as appropriate, whenever signals enter the second input terminals of the AND gates.

Therefore, the four interrupt request signals are assigned to each priority level with the following signal flow:

the external interrupt request signal is delivered to terminal L of the interrupt control circuit through AND gate (5-1) and OR gate (8), and thus is assigned to a low priority level;

the timer interrupt request signal is delivered to terminal H of the interrupt control circuit through AND gate (4-2) and OR gate (7), and thus is assigned to a high priority level;

the serial interface interrupt request signal is delivered to terminal H of the interrupt control circuit through OR gate (15-1), AND gate (4-3) and OR gate (7), and thus is assigned to a high priority level;

the analog/digital interrupt request signal is delivered to terminal L of the interrupt control circuit through OR gate (15-2), AND gate (5-4) and OR gate (8), and thus is assigned to low priority level.

Since the software interrupt request signal SIC1 is issued in order to process a plurality of interrupt requests which arose at the same time, it should not be allocated to a so-called high priority which prohibits processing of an interrupt request signal given a low priority from being performed. For this reason, the software interrupt request signal SIC1 must always be assigned to a low priority processing level.

To meet this requisite, the software interrupt request signal SIC1 must be assigned to the same priority assignment data selector to which the external interrupt request signal and the analog/digital interrupt request signal are assigned. More specifically described, latch circuit (12-1) is set to produce an output value of the software priority setting data SIC0 of "1" consistently and leave AND gate (14-2) in an operating condition (enabled).

With the above state, multiple interrupt processing is executed when the external interrupt request signal and the timer interrupt request signal arise simultaneously during the processing of the main program through the following steps of:

suppressing the processing of the main program;

performing the minimum required timer interrupt processing assigned to a high priority level;

nesting the remaining timer interrupt processing with a high priority and then executing an external interrupt processing with a low priority; and completing the external interrupt processing; whereby the multiple interrupt processing is completed.

Thereafter, a software interrupt request signal, SIC1, assigned a low priority is produced at terminal Q of latch circuit (12-2) based on the pulse WSIC. This software interrupt request signal is then applied to terminal L of interrupt control circuit (11) through AND gate (14-2), OR gate (15-2), AND gate (5-4) and OR gate (8). Thus, the rest of the timer interrupt processing is executed by means of the software interrupt processing.

As can be seen from the above explanation, even if an interrupt request signal is assigned to an arbitrary priority processing level by arbitrarily arranging the arrangement of latch circuits (2-1) to (2-4), software interrupt request signal SIC1 can be set to a low priority level consistently by latching circuit (12-1) so as to produce an output of software priority setting data SIC0 which corresponds to the priority level of the interrupt request signal.

Consequently, the software interrupt processing can be controlled reliably in accordance with a user's desire without any malfunction unlike what frequently occurred when two interrupt processing requests occurred at the same time in the prior art.

According to the present invention, no matter whether an interrupt request signal is assigned to a low priority level or a high priority level, software interrupt processing can be executed without fail, because the software interrupt request signal can consistently be assigned to a low priority level by means of the second priority assignment control circuit.

Thus, the present invention secures the proper operation of multiple interrupt processing, preventing malfunction.

What is claimed is:

1. An interrupt circuit for a microcomputer, comprising:

(a) an interrupt control circuit having a first input terminal to which a first interrupt request signal assigned to high priority level is applied, and a second input terminal to which a second interrupt request signal assigned to a low priority level is applied, said interrupt control circuit being capable of performing an interrupt processing based on each interrupt request signal;

(b) a first priority assignment control circuit for producing said first and second interrupt request signals to said first and second input terminals, which is capable of assigning one of said high priority level and said low priority level to each of a plurality of interrupt request signals; and (c) a second priority assignment control circuit for producing a software interrupt request signal to said second input terminal, which is capable of assigning a low priority level to said software interrupt request signal different from said plurality of interrupt request signals, said software interrupt request signal being produced while a minimum required interrupt processing based on said first interrupt request signal is being carried out so that an interrupt processing based on said second interrupt request signal is carried out before said software interrupt request signal enables a remaining interrupt processing based on said first interrupt request signal.

2. An interrupt circuit according to claim 1, wherein said first priority assignment control circuit comprises:
 (a) a plurality of first latch circuits for assigning one of said high priority level and said low priority level to each of said plurality of interrupt request signals; and
 (b) a plurality of priority assignment selectors for applying each of said plurality of interrupt request signals to one of said first and second input terminals based on an output from said first latch circuits.

3. An interrupt circuit according to claim 2, wherein said second priority assignment control circuit comprises:
 (a) a second latch circuit for latching said software interrupt request signal;
 (b) a third latch circuit for latching a software priority setting data for assigning said low priority level to said software interrupt request signal; and
 (c) a changeover circuit for assigning said low priority level to said software interrupt request signal based on the software priority setting data, whereby said software interrupt request signal is applied to said second input terminal of said interrupt control circuit through said changeover circuit and said priority assignment selectors.

4. An interrupt processing method for use in microprocessors for executing interrupt processing in response to either a first interrupt request signal assigned to a high priority level or a second interrupt request signal assigned to a low priority level, the method comprising the steps of:
 assigning a low priority to a software interrupt request signal according to a predetermined instruction included in a program of said microcomputer;
 issuing said software interrupt request signal and executing a minimum required processing of said first interrupt request signal during processing of said first interrupt request signal;
 executing processing of said second interrupt request signal;
 terminating processing of said second interrupt request signal; and
 resuming a rest of the processing of said interrupted first request signal in response to said software interrupt request signal.

* * * * *